Oct. 31, 1967   J. J. BLUMENKRANZ   3,350,056
SEALING MEANS FOR A GATE VALVE
Filed Nov. 10, 1964   2 Sheets-Sheet 1

INVENTOR
JAMES J. BLUMENKRANZ
BY Laurence R. Hepler
ATTORNEY

Oct. 31, 1967          J. J. BLUMENKRANZ         3,350,056
SEALING MEANS FOR A GATE VALVE
Filed Nov. 10, 1964                                          2 Sheets-Sheet 2
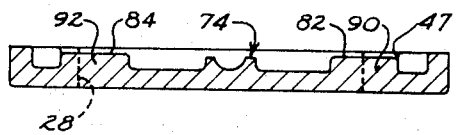
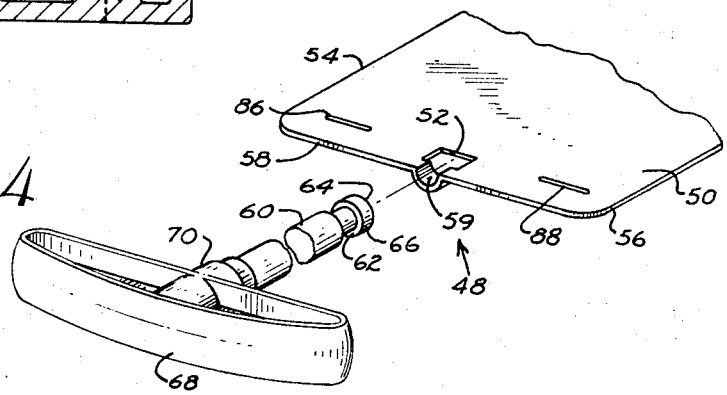
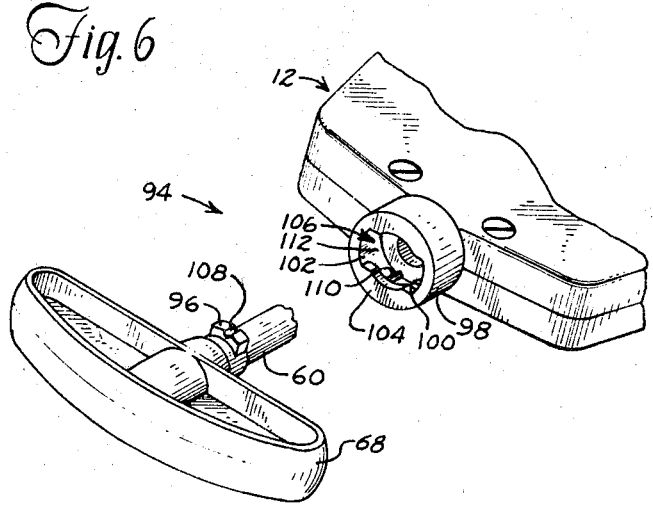
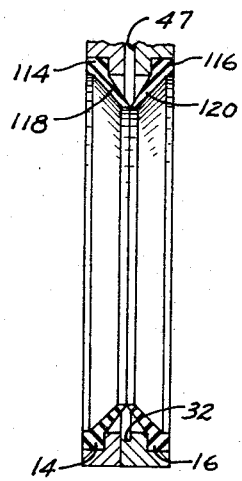
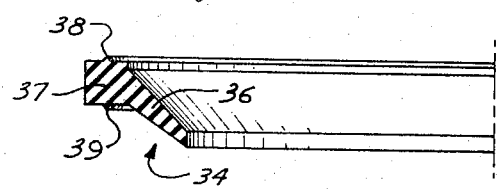
INVENTOR
JAMES J. BLUMENKRANZ
BY *Lawrence R. Hepter*
ATTORNEY United States Patent Office 3,350,056
Patented Oct. 31, 1967

3,350,056
SEALING MEANS FOR A GATE VALVE
James J. Blumenkranz, Hollywood, Calif., assignor to Atlantic Research Corporation, Fairfax County, Va., a corporation of Virginia
Filed Nov. 10, 1964, Ser. No. 410,157
7 Claims. (Cl. 251—100)

This invention relates to gate valves, and more particularly, to gate valves employed as vehicle waste valves.

Vehicle waste valves serve the purpose of closing off one end of a vehicle's waste removal system when the vehicle is mobile or divorced from a complete sewage system. Conventional vehicle waste removal systems consist of a water closet, sink, other plumbing facilities, a waste storage tank and appropriate conduit interconnecting the latter with the other elements. A vehicle waste valve is used to seal the storage tank when the vehicle is not hooked into a complete sewage system and to permit the stored matter to be evacuated from the tank when the vehicle is connected into a complete sewage system.

One of the most common problems with present day vehicle waste valves is their inability to prevent the waste matter flowing through the valve from entering and flooding the valve housing or chamber. Because of the nature of the stored matter, it is imperative to prevent this matter from flooding the valve chamber since this would lead to contamination and putrefaction of the valve. Another major problem facing vehicle waste valves is the corrosive environment to which they are constantly subjected. Most present day valves employ seals fabricated from rubber or similar material which is easily attacked by the corrosive atmosphere. It is also necessary to ensure that the valve remains closed during travel of the vehicle when it is subjected to considerable vibration caused by the vehicle motion. Furthermore, the valve must have minimum dimensions due to the restricted space available in vehicles for mounting the waste valve.

Accordingly, it is one object of the present invention to provide an improved gate valve which prevents the material flowing therethrough from flooding the valve chamber.

It is another object of the present invention to provide an improved gate valve capable of being easily locked in a normally closed position.

It is a further object of the present invention to provide an improved gate valve which is corrosion-resistant, inexpensive to manufacture and service, and relatively maintenance-free.

Further objects and attendant advantages will be obvious from the following description and the accompanying drawings.

Briefly stated, this invention, in one form, comprises a plastic molded housing formed from two body members. The lower portion of each body member has a bore extending therethrough. One of the members includes an annular recess circumscribing its respective bore and within which is mounted a corrosion-resistant, resilient seal having a lip portion extending radially inwardly from the recess. Immediately adjacent to the recess is a channel which circumscribes the bore. A passageway, aligned with and communicating with the channel, extends through the lower portion of the valve and opens into a chamber formed in the upper portion of the valve's body members.

A gate is mounted within the housing and slides through the pasageway and is received within the channel when the valve is closed. The gate is actuated by a valve stem which is mechanically connected to one end of the gate and which extends through the uppermost portion of the body members so as to be accessible to the valve operator. The stem is connected to the gate in a manner permitting relative rotational motion between the stem and the gate while preventing relative translational motion therebetween.

When the valve is in an open position the gate is retracted into the upper portion of the valve and the lip of the seal, biased by its inherent resiliency, abuts the valve on the other side of the channel to effect sealing of the channel and pasageway from the bore. To close the valve, a force is applied to the stem which causes the gate to slide through the passageway and within the channel until the bores are completely obturated by the gate. In this closed position the seal lip abuts against the gate to completely seal the passageway from the bores.

In order to lock the gate in its closed position a pair of diametrically opposed lugs extend radially outwardly from the stem adjacent the end thereof which protrudes through the valve housing. A pair of slots parallel to the path of movement of the stem extend inwardly from the outer surface of the end of the valve. These slots intersect an annular groove which is concentric with the stem and displaced from the outer surface of the housing. During the translational motion of the gate to effect closing thereof the lugs slide within the slots and, when the gate is in the closed position, reside within the annular groove. Angular displacement of the stem, such as by rotating it 90°, causes the lugs to ride within the groove and, thus, prevents opening of the valve. To ensure locking the valve in a closed position an indentation is provided in the edge of each lug. These indentations mate with projections extending into the groove and lock the valve in place.

In the drawings, wherein like reference characters denote identical parts,

Figure 2:
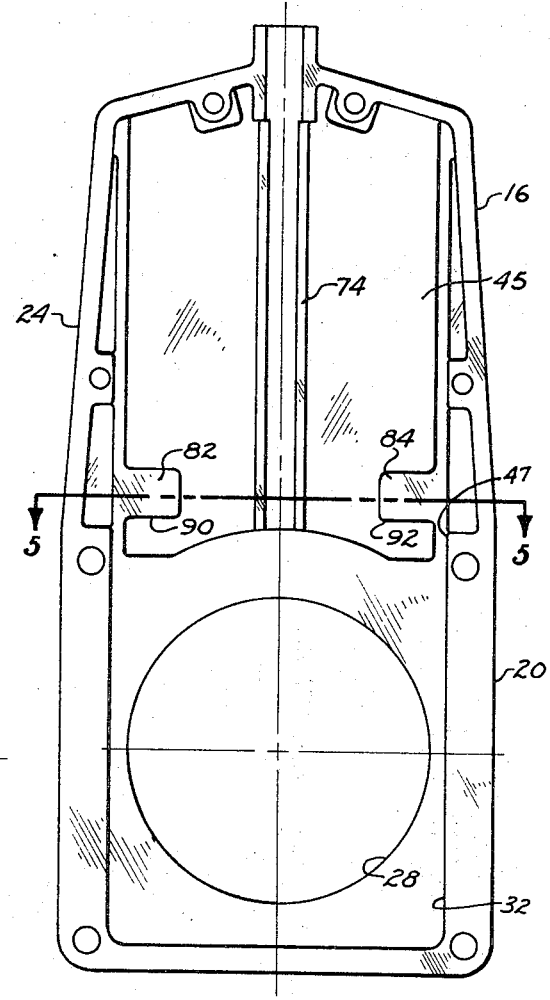
FIGURE 2 is a front view of the interior of one of the housing's body members.

FIGURE 3 is an enlarged sectional view of a sealing means employed in this invention, FIGURE 4 is a perspective view illustrating one means for locking the valve in a closed position and illustrating the means for attaching a valve stem to a gate, FIGURE 5 is a sectional view taken along the lines 5—5 of FIGURE 2, FIGURE 6 is a perspective view illustrating a second means for locking the valve in a closed position, and FIGURE 7 is a sectional view of the lower portion of a valve formed in accordance with a second embodiment of this invention.

Figure 1:
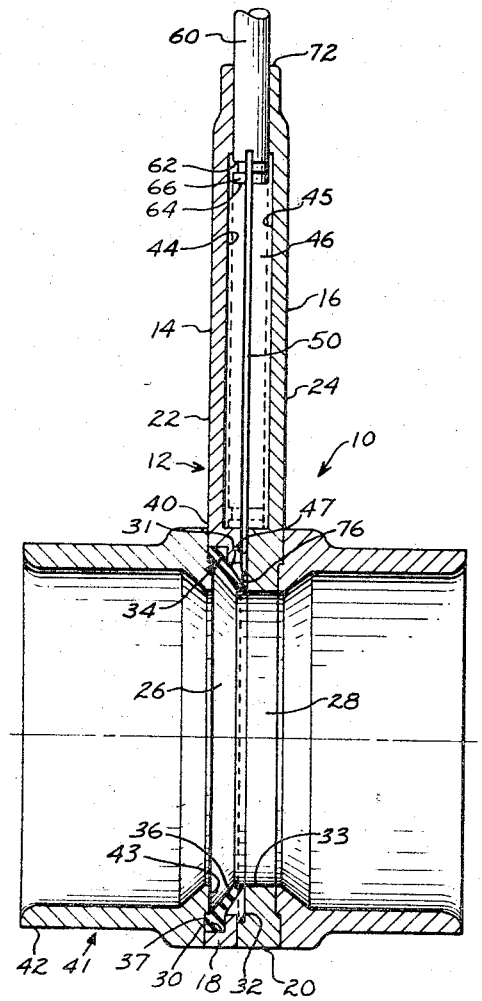
FIGURE 1 is a sectional view of a first embodiment of this invention.

With reference to the drawings, and more particularly to FIGURES 1 and 2, there is shown a gate valve 10 which forms the first embodiment of this invention. The valve 10 comprises a housing 12 formed of first and second body members 14, 16 each having a lower portion 18, 20, respectively, and an upper portion 22, 24, respectively. The body members 14, 16 are fabricated from a moldable impact-resistant, chemically inert material such as polyamides, e.g., nylon, acrylic resin, polycarbonate, and acetal resin. The lower portions 18, 20 have bores 26, 28 extending transversely therethrough, the bores being coaxial when the body members 14, 16 are in their assembled position. An annular recess 30 is provided in the inner surface 31 of the lower portion 18 of the first body member 14, the recess 30 circumscribing the bore 26 of the first body member. A channel 32 is formed in the inner surface 33 of the lower portion 20 of the second body member 16 which circumscribes the bore 28 of the second body member. The channel 32 is located adjacent to the recess 30 as can be seen in FIGURE 1. Alternatively, however, the groove 32 can be provided in the first member 14 adjacent to the recess 30.

An annular seal 34 (see FIGURE 3) is mounted within the recess 30 and has a lip portion 36 which extends inwardly towards the axis of the seal 34 and obliquely relative to a plane passing through the seal base 37. Annular projections 38, 39 are formed on the seal 34, one projection being provided on each face of the base 37. The projections ensure proper and necessary sealing even if the faces of the base 37 have relatively minor depressions or other imperfections. The lip portion 36 is formed so as to be inherently resiliently biased in the direction of flow towards the second body member 16 such that it abuts the inner surface 33 of the second body member on the opposite side of the channel 32 thus completely sealing the channel 32 from the bores 26, 28. For ease of assembling, the recess 30 communicates with the outer surface 40 of the first body member 14 as this will permit the seal 34 to be easily inserted within the recess by merely sliding it into place. The seal is fabricated from a resilient material such as halogenated hydrocarbon polymers, e.g., Teflon, Kel-F; polyamides, e.g., nylon; synthetic rubbers, e.g., Buna-N, neoprene; polypropylene; and ethylene-vinyl acetate. However, because of the corrosive environment in which the seal is used it has been found preferable to mold the seal from polyethylene.

Since the valve 10 is used in waste removal systems where the pressure involved is substantially atmospheric, the inherent resilience of the lip 36 must be sufficient to perform the sealing function. Any positive pressure available from the flow stream will serve to further the sealing effort.

To hold the seal 34 in place within the recess 30, a pipe coupling 41 is removably attached to the outer surface 40 of the first body member 14 such as by bolts (not shown). The pipe coupling 41 includes a cylindrical or tubular portion 42 for receiving the conduit leading from the storage tank (not shown) and, therefore, can be either threaded or smooth, depending upon whether a threaded or welded connection is desired. The end of the pipe coupling 41 which is attached to the body member 14 is provided with an extension 43 which fits under the seal 34, locking the seal within the recess 30 and aligning the pipe coupling 41 with respect to the bores 26, 28.

Each of the upper portions 22, 24, is formed with a cavity 44, 45 in the inner surface thereof so as to form, cooperatively, a chamber 46 when the body members 14, 16 are assembled to form the valve housing 12. A passageway 47 extends from the chamber 46 into the channel 32 with which it is aligned and is formed in the same body member in which the channel 32 is formed. For example, as shown in FIGURE 1, the passageway 47 is provided in the second body member 16 as is the channel 32.

The body members 14, 16 are assembled together by any means which permits easy separation of the two. One such method is by bolting them together, tightly enough to make the chamber 46 substantially liquid-tight. This permits retention of any liquid which may flow into the upper portion of the valve 10 in the event some leakage past the seal 34 occurs.

Slideably mounted within the valve housing 12 is a gate and stem assembly 48, illustrated in FIGURE 4. The gate 50, formed of plastic or metal, preferably stainless steel, has a slot 52 centrally located between its edges 54, 56 and located adjacent to one end 58 and separated from that end by a bar 59. The width of gate 50 is substantially the same as the width of the passageway 47 to permit sliding of the gate through the passageway as described below.

A stem 60, having a circular cross section, is attached to the gate 50 so as to permit relative rotational motion but prevent relative translational motion therebetween. This is accomplished by forming an annular groove 62 adjacent to one end 64 of the stem 60. The portion 66 of the stem 60 between the groove 62 and the end 64 is received by the gate slot 52 while the bar 59 lying between the slot 52 and the gate end 58 is received within the stem's groove 62. For more effective attachment of the stem and gate the bar 59 is depressed to more securely fit within the groove 62. A handle 68 is fixedly attached to the other end 70 of the stem to permit easy manual operation of the gate 50.

The stem and gate assembly 48 is slideably mounted within the housing 12 to permit translational movement of the gate 50 therewithin. The end 70 of the stem 60 protrudes through the uppermost end 72 of the housing 12 so that the handle 68 is accessible to the valve operator. In order to support the stem 60 and permit translational and rotational motion of the stem 60 relative to the housing 12, an elongated journal bearing 74 is formed on the inner surface of the body members 14, 16 as may be seen in FIGURES 2 and 5.

The valve 10 in its assembled and open position is illustrated by the solid lines in FIGURE 1. In order to close the valve a force is applied to the handle 68 causing the stem 60 and gate 50 to translate such that the gate 50 moves through the passageway 47 and within the channel 32 until the gate 50 completely obturates the bores 26, 28. The closed position is illustrated by the dotted lines in FIGURE 1. Movement of the gate 50 into the closed position causes the lip 36 of the seal 34 to abut against the gate 50, rather than against the inner surface 33 of the housing 12, in a time sequence continuous with the translation of the gate 50 into its closed position. Therefore, when the valve is closed the lip 36, which is on the upstream side of the gate 50, abuts the gate to effectively seal the channel 32 and passageway 47 from the bores 26, 28. The lip 36 is sufficiently rigid along its length to provide a scraping action along the gate 50 in order to remove all particulate matter from the face of the gate 50. To avoid cutting the seal 34 during movement of the gate 50 from its open to the closed position, the end 76 of the gate which is adjacent to the seal 34 is radiused or beveled.

There is provided a locking means in order to ensure that the valve 10 remains in its closed position while the vehicle in which it is mounted is mobile and subject to continuous vibration. One form of locking means, shown in FIGURES 2, 4, and 5, consists of a pair of projections or tabs 82, 84 formed on the inner surface of the second body member 16. These tabs 82, 84 extend inwardly toward the middle of the chamber 46 and lie in a plane parallel to the interface between the first and second body members 14, 16 when these members are in the assembled position. Cooperating with these tabs to provide the locking function are a pair of detents 86, 88 stamped in the gate 50 near the sides 56, 58, respectively. When the gate 50 is in its closed position the detents 86, 88 abut against the lower edges 90, 92 of the tabs 82, 84, respectively, thus locking the valve 10 closed. In order to open the valve 10 sufficient force must be exerted on the stem 60 to cause the detents 86, 88 to spring and ride over the tabs 82, 84 thus permitting translation of the gate into its open position.

A second and preferred locking means is illustrated at 94 in FIGURE 6. The locking means 94 comprises a pair of diametrically opposed lugs 96, only one of which is illustrated, which extend radially outwardly from the valve stem 60. For manufacturing convenience, since the stem may be formed of metal and the handle 68 is preferably formed of molded plastic, the lugs 96 can be molded as part of the handle. This is equivalent to making lugs an integral part of the stem 60 since the handle 70 is fixedly mounted on the stem.

As shown in FIGURE 6, a hub 98 is formed on the uppermost end 72 of the housing 12 to contain the remainder of the locking means 94. A pair of slots 100, 102, oriented and sized to receive the lugs 96, extend from the outer surface 104 of the hub 98 inwardly and in a direction parallel to the translational path of the stem 60. Displaced from the outer surface 104 of the hub 98 is an annular groove 106. The groove 106 is concentric with the journal bearing 74 and, therefore, concentric with the stem 60 when the stem and gate assembly 48 are mounted within the valve housing 12. As the valve 10 is closed the lugs 96 ride within the slots 100, 102 until, coincident with the complete obturation of the bores 26, 28 by the gate 50, the lugs 96 reside in the annular groove 106. Rotation of the handle 68 and the stem 60 causes the lugs 96 to be angularly displaced with respect to the slots 100, 102 and thus prevents translational motion of the stem 60 and, consequently, of the gate 50. To ensure locking the gate 50 in this closed position, an indentation 108 is formed in the edge of each lug 96 and two diametrically opposed projections 110 (only one of which is shown) are formed on the wall 112 of the groove 106, the projections 110 being substantially equal in size and shape to the indentations 108. To lock the gate 50 in its closed position, the handle 68 is rotated until the projections 110 snap into indentations 108 of the lugs 96 to form a locking, mating relationship.

A second embodiment of this invention, illustrated in FIGURE 7, is a modification of the above-described first embodiment in that a pair of seals 114, 116 having inwardly extending lips 118, 120, respectively, are employed. One seal is mounted in each body member 14, 16 and the lips 118, 120 are resiliently biased towards the interface of the body members 14, 16. When the valve 10 is in the open position, the lips 118, 120 abut against each other thus completely divorcing the channel 32 and passageway 47 from the bores 26, 28. When the valve 10 is closed the lips 118, 120 abut against the gate 50 (not shown) to again completely seal the channel 32 and passageway 47 from the bores 26, 28. The seals 114, 116 are held in place in the body members 14, 16, respectively, in the same manner as discussed above with respect to seal 34 of the first embodiment (see FIGURE 1).

Most of the valve parts discussed above, that is, the pipe coupling, the body members, the handle, and the seals can be easily formed of molded plastics and, therefore, the desired shapes can be easily attained without expensive machining. Similarly, the gate can be stamped from sheet metal and easily assembled onto the stem. It should, therefore, be obvious that the manufacturing and assembling of the valve of this invention is quite simple and inexpensive and, therefore, inexpensive to service. Wear tests have shown that fabrication of the gate from stainless steel, the seal from polyethylene, and the body members from acrylonitrile-butadiene-styrene or rigid polyvinyl chloride provide a long-life, corrosion-resistant valve which is essentially free from maintenance. It should also be noted that while the above discussion relates to a valve housing formed from two independent members, this being the preferred embodiment, the housing also could be molded as a single member.

What is claimed as new and desired to be secured by Letters Patent of the United States is:

1. A gate valve comprising:
   (a) a housing including first and second body members each having an upper and lower portion,
      (i) said lower portion of each of said members having a bore extending transversely therethrough, the bore of said first member being coaxial with the bore of second member when said members are in an assembled position forming said housing, said first member having a recess circumscribing its respective bore, the lower portion of one of said members having a channel circumscribing its respective bore, said channel being adjacent to said recess,
      (ii) each of said upper portions of said members having a cavity in the inner surface thereof to form, cooperatively, a substantially liquid-tight chamber when said members are in said assembled position,
      (iii) said housing having a passageway through said lower portion aligned with and communicating with said channel,
   (b) a gate slidably mounted within said housing and adapted to be moved through said passageway and within said channel from a closed position wherein said gate obturates the bores to an open position wherein said gate is in noninterfering relationship with said bores, said gate having a slot adjacent to the end thereof remote from said bores,
   (c) a seal mounted in said recess in said first member completely circumscribing the bore through said first member, said seal having a resilient lip portion extending radially inwardly and being resiliently biased to abut said housing on the other side of said channel to seal said channel and said passageway from said bores when said gate is in said open position, said lip portion abutting said gate to seal said channel and said passageway from said bores when said gate is in said closed position, said sealing being effected by the resilience of said lip,
   (d) a stem including a first portion commencing at one end thereof having a diameter larger than a second portion of said stem immediately contiguous to said first portion, said first portion being received by said slot to permit relative rotational motion and prevent relative translational motion between said stem and said gate, the end of said stem remote from said one end of said stem extending through the end of the upper portions of said members remote from said lower portions and being adapted for actuation thereof, and
   (e) locking means for retaining said gate in said closed position until said gate is intentionally moved into said open position, said locking means comprising
      (i) a projection formed on the upper portion of one of said body members, said projection extending inwardly toward the middle of said chamber and lying in a plane parallel to the interface between said first and said second body members when said members are in said assembled position, and
      (ii) a detent formed in said gate located so as to engage said projection when said gate is in said closed position to prevent translation of said gate within said housing, intentional actuation of said gate toward said open position causing said detent to spring and ride over said projection.

2. A gate valve comprising:
   (a) a housing including first and second body members each having an upper and lower portion,
      (i) said lower portion of each of said members having a bore extending transversely therethrough, the bore of said first member being coaxial with the bore of second member when said members are in an assembled position forming said housing, said first member having a recess circumscribing its respective bore, the lower portion of one of said members having a channel circumscribing its respective bore, said channel being adjacent to said recess,
      (ii) each of said upper portions of said members having a cavity in the inner surface thereof to form, cooperatively, a substantially liquid-tight chamber when said members are in said assembled position,
      (iii) said housing having a passageway through said lower portion aligned with and communicating with said channel,
   (b) a gate slidably mounted within said housing and adapted to be moved through said passageway and within said channel from a closed position wherein said gate obturates the bores to an open position wherein said gate is in noninterfering relationship with said bores, said gate having a slot adjacent to the end thereof remote from said bores, (c) a seal mounted in said recess in said first member completely circumscribing the bore through said first member, said seal having a resilient lip portion extending radially inwardly and being resiliently biased to abut said housing on the other side of said channel to seal said channel and said passageway from said bores when said gate is in said open position, said lip portion abutting said gate to seal said channel and said passageway from said bores when said gate is in said closed position, said sealing being effected by the resilience of said lip, (d) a stem including a first portion commencing at one end thereof having a diameter larger than a second portion of said stem immediately contiguous to said first portion, said first portion being received by said slot to permit relative rotational motion and prevent relative translational motion between said stem and said gate, the end of said stem remote from said one end of said stem extending through the end of the upper portions of said members remote from said lower portions and being adapted for actuation thereof, and (e) locking means for retaining said gate in said closed position until said gate is intentionally moved into said open position, said locking means comprising
  (i) a lug extending radially outwardly from said stem, the edge of said lug having an indentation formed therein,
  (ii) an annular groove formed in said housing concentric with said stem and displaced from the outer surface of said housing,
  (iii) a projection extending into said annular groove, said projection being substantially equal in size and shape to said indentation, and
  (iv) a slot extending from the outer surface of said housing inwardly to said annular groove, said slot being parallel to the translational path of said stem and being angularly displaced from said projection, said slot receiving said lug when said gate is translating into said closed position, said lug residing in said annular groove when said gate is in said closed position, locking said gate in said closed position being effected by rotation of said stem causing said indentation to receive said projection.

3. A gate valve comprising:

(a) a housing including first and second body members each having an upper and lower portion,
  (i) said lower portion of each of said members having a bore extending transversely therethrough, the bore of said first member being coaxial with the bore of said second member when said members are in an assembled position forming said housing, said first member having an annular recess circumscribing its respective bore, one of said members having a channel circumscribing its respective bore,
  (ii) each of said upper portions of said members having a cavity in the inner surface thereof to form, cooperatively, a chamber when said members are in said assembled position, said upper portions, when in assembled position, having a journal bearing centrally disposed along the length of the inner surface thereof,
  (iii) said housing having a passageway aligned and communicating with said channel and interconnecting at least one of said bores and said chamber, (b) a gate slideably mounted within said housing and adapted to be moved through said passageway from a closed position wherein said gate obturates said bores to an open position wherein said gate is in noninterfering relationship with said bores, the end of said gate adjacent said bores having a rounded edge, said gate having a slot adjacent to the other end of said gate, the portion of said gate between said slot and said other end being depressed, (c) an annular seal mounted in said annular recess in said first member, said seal having a resilient lip portion extending radially inwardly and being resiliently biased to abut said second member on the other side of said channel to seal said passageway and said channel from said bores when said gate is in said open position, said seal abutting said gate to seal said passageway and said channel from said bores when said gate is in said closed position, sealing of said passageway and said channel being effected by the resilience of said seal, (d) a stem having a circular cross section, said stem having an annular groove provided near one end thereof, the portion of said stem between said groove and said one end being received by said slot, said groove receiving said depressed portion of said gate to permit relative rotational motion and prevent relative translational motion between said stem and said gate, the end of said stem remote from said one end of said stem extending through the end of the upper portions of said members remote from said lower portions and being adapted for actuation thereof, said stem being received and supported by said journal bearings, and (e) locking means for retaining said gate in said closed position until said gate is intentionally moved into said open position.

4. A gate valve as defined in claim 3 wherein said first and second body members are molded thermoplastic material having high resistance to chemical attack and wherein said seal is molded polyethylene.

5. A gate valve as defined in claim 3 wherein said recess is provided in the face of said first member which is exposed when said housing is assembled and wherein said valve includes a pipe coupling removably affixed to said face of said first member, said pipe coupling retaining said seal in said recess.

6. A gate valve as defined in claim 3 wherein said lip portion of said seal is sufficiently rigid in a radial direction to effect scraping of particulate matter from said gate during movement thereof.

7. A gate valve comprising:

(a) a housing including first and second body members each having an upper and lower portion,
  (i) said lower portion of each of said members having a bore extending transversely therethrough, the bore of said first member being coaxial with the bore of said second member when said members are in an assembled position to form said housing, each of said members having an annular recess circumscribing its respective bore, one of said members having a channel interposed between said recesses and circumscribing its respective bore,
  (ii) each of said upper portions of said members having a cavity in the inner surface thereof to form, cooperatively, a chamber when said members are in said assembled position, said upper portions, when in assembled position, having a journal bearing centrally disposed along the length of the inner surface thereof,
  (iii) said housing having a passageway aligned and communicating with said channel and interconnecting at least one of said bores and said chamber, (b) a gate slideably mounted within said housing and adapted to be moved through said passageway and within said channel from a closed position wherein said gate obturates said bores to an open position wherein said gate is in noninterfering relationship with said bores, the end of said gate adjacent said bores having a rounded edge, said gate having a slot adjacent to the other end thereof, the portion of said gate between said slot and said other end being depressed, (c) an annular seal mounted in each of said recesses, each of said seals having a resilient lip portion extending radially inwardly and being resiliently biased to abut the other of said seals to seal said passageway and said channel from said bores when said gate is in said open position, each of said seals abutting said gate to seal said passageway and said channel from said bores when said gate is in said closed position, sealing of said passageway and said channel being effected by the resilience of said seals, (d) a stem having a circular cross section, said stem having an annular groove provided near one end thereof, the portion of said stem between said groove and said one end being received by said slot, said groove receiving said depressed portion of said gate to permit relative rotational motion and prevent relative translational motion between said stem and said gate, the end of said stem remote from said one end of said stem extending through the end of the upper portions of said members remote from said lower portions and being adapted for actuation thereof, said stem being received and supported by said journal bearing, and (e) locking means for retaining said gate in said closed position until said gate is intentionally moved into said open position.

References Cited

UNITED STATES PATENTS

| | | | |
|---|---|---|---|
| 1,808,715 | 6/1931 | Reynolds | 251—319 X |
| 1,888,130 | 11/1932 | Huffman | 251—100 |
| 2,732,170 | 1/1956 | Shand | 251—172 |
| 3,000,608 | 9/1961 | Williams | 251—328 X |
| 3,212,753 | 10/1965 | Milette | 251—328 X |

FOREIGN PATENTS 675,565　12/1963　Canada.

WILLIAM F. O'DEA, *Primary Examiner.*

HAROLD W. WEAKLEY, *Examiner.*